United States Patent Office 2,844,458
Patented July 22, 1958

2,844,458

METHOD OF INTRODUCING TITANIUM INTO MOLTEN METALS AND COMPOSITION FOR SUCH PROCESS

John H. Hillman III, Pittsburgh, Pa.

No Drawing. Application January 28, 1954
Serial No. 406,888

1 Claim. (Cl. 75—27)

This invention relates to metallurgy and is for a process of introducing titanium or other addition metal into steel and a composition for use in such process.

The introduction of titanium into steel, especially stainless steel has long been recognized as a desirable practice. It is generally done by using ferro-titanium as an addition material that is charged into the molten steel. Ferro-titanium is expensive and its use adds substantially to the cost of steel.

My invention has for its object to provide an improved method for the introduction of titanium into steel at a cost considerably below present methods.

My invention has for a further object to provide an addition material to steel which is relatively inexpensive.

These and other objects and advantages are obtained by my invention, as will hereinafter more fully appear.

It has long been known that by the so called thermit process utilizing a mixture of finely divided aluminum and titanium dioxide, the oxide could be reduced to metallic titanium, especially in the presence of other oxides or decomposable oxygen compounds, such for example as iron oxide, nickel oxide or alkaline earth compounds such as calcium carbonate, calcium sulphate and calcium phosphate.

For the manufacture of a ferro-titanium addition material to steel a mixture of titanium dioxide or rutile and iron oxide in the form of mill scale are mixed with finely divided aluminum in a crucible. Using magnesium as a starter, this mix can be ignited and will react, the titanium dioxide and the iron oxide yielding their oxygen to the aluminum, the titanium and iron being thereby reduced to metal and forming a fused mass of ferro-titanium. The ferro-titanium so produced is used as an addition material to steel where titanium is required, usually being charged cold into a melted heat of metal in an electric furnace.

In the initial stage of the reduction of the titanium dioxide the reaction is highly exothermic and very high temperatures are reached, but as the titanium dioxide yields part of its oxygen and titanium oxide forms, the reaction slows down and eventually is endothermic. In the above process, if the reaction is effected with a great mass of material in a large crucible there is sufficient mass and heat to carry the reaction to the final reduction of the titanium, but in small amounts the reaction generally stops before metallic titanium has been produced.

Large crucibles for carrying out the reaction are expensive and they are usually unusable after two reactions, so that the crucible cost per ton of ferro-titanium is substantial.

According to a preferred embodiment of my invention titanium dioxide, as for example rutile, is mixed with powdered aluminum in the ratio of about one part by weight of aluminum to two of rutile. Calcium carbonate, in the form of powdered limestone, may be added in an amount between 10% and 50% of the mixture of rutile and aluminum but should be accompanied by the addition of aluminum in the proportion of about one part by weight of aluminum to every three parts by weight of calcium carbonate added. Sufficient lime is added to the mix to form a bond and the mixture is wet with enough water so that it may be molded into cakes or shapes or pressed into briquettes and dried until the lime has set and all free water is removed.

The dry bonded masses thus formed may be introduced directly into a molten charge of steel in an electric furnace and being bonded the ingredients of the mix cannot separate or stratify during handling or when being thrown into the furnace. Upon being charged into the molten metal the temperature of the molten steel will almost instantly ignite the mass with the aluminum-oxygen reaction taking place.

Instead of the charge in the furnace being cooled, as with the charging of ferro-titanium, heat will be liberated in the charge by my process. Thereafter the heat of the steel and the furnace provides the reserve of heat necessary to carry the reduction of the titanium oxide through to completion—it provides the same incandescent environment as the interior of the crucible in the present practice of making ferro-titanium.

Thus with my method, the titanium dioxide is reduced in situ in the bath of molten steel, the lime forms a flux and the resulting aluminum oxide becomes part of the slag. The use of a crucible and the attendant labor for separately effecting the reaction is eliminated.

Instead of using lime, I may use some other binder, as for example gypsum or plaster of Paris. The amount of binder should be as little as possible so as not to interfere with the aluminum-titanium dioxide reaction, and I may even use a combustible binder, such as tar or pitch. Also instead of a binder to integrate the oxide and aluminum, a metal capsule or a glass or ceramic vessel that disintegrates in the molten metal may be used.

Moreover, I may use with the rutile other oxygen compounds, as calcium carbonate, or iron oxide, or other metal oxide that is compatible with the steel being processed.

As I have explained my invention avoids the expense and labor attendant to separately producing ferro-titanium; it eliminates the cooling of the electric furnace charge which results when the usual cold addition materials are thrown in; it provides for the right amount of titanium being easily added, and since the bath of molten steel replaces the crucible, nothing is destroyed as in the crucible method. In addition to this the method aids in the deoxidizing of the steel.

The bonded mass or briquette of bonded aluminum powder and rutile can be shipped, handled, and stored, and segregation of the lighter aluminum component from the heavier oxides cannot occur, and the materials are held in intimate physical contact until the instant of reaction.

Other materials than rutile may be used as a source of titanium. For example ilmenite, a native mixture of titanium and iron oxides, may be used. Also, by using zirconium oxide in place of titania, zirconium can be similarly reduced in situ and introduced into steel or other molten alloy. Other metals may likewise be added to metal by this method.

Moreover I have specifically referred herein to aluminum as the reactive metal in the thermit mixture but magnesium may be used, or mixtures of these two metals may be used.

While I have described specific embodiments of my invention, various changes and modifications may be made therein as will be apparent to those skilled in the art.

I claim:

An addition material to be charged directly into a heat of steel comprising at least 50% of a mixture of powdered metal of the group consisting of aluminum and magnesium and an oxide of a metal of the group consisting of titanium and chromium in the ratio of one part by weight of aluminum to two parts of metal oxide, said material also containing calcium carbonate with one additional part of the powdered metal for each three parts of calcium carbonate, the calcium carbonate being in the range of 10% to 50% of the total mass, the material being bonded into a mass by lime as a bonding medium.

References Cited in the file of this patent

UNITED STATES PATENTS

| | | |
|---|---|---|
| 1,119,643 | Saklatwalla | Dec. 1, 1914 |
| 2,036,576 | Hardy | Apr. 7, 1936 |
| 2,082,783 | Armstrong et al. | June 8, 1937 |
| 2,135,189 | Linz | Nov. 1, 1938 |
| 2,185,081 | Head | Dec. 26, 1939 |
| 2,337,314 | Dephler | Dec. 21, 1943 |